(12) United States Patent
Monden

(10) Patent No.: US 8,340,370 B2
(45) Date of Patent: Dec. 25, 2012

(54) PATTERN VERIFICATION APPARATUS, PATTERN VERIFICATION METHOD, AND PROGRAM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 142 days.

(21) Appl. No.: 12/918,295

(22) PCT Filed: Jan. 13, 2009

(86) PCT No.: PCT/JP2009/050276
§ 371 (c)(1),
(2), (4) Date: Aug. 18, 2010

(87) PCT Pub. No.: WO2009/104429
PCT Pub. Date: Aug. 27, 2009

(65) Prior Publication Data
US 2010/0332487 A1 Dec. 30, 2010

(30) Foreign Application Priority Data
Feb. 19, 2008 (JP) ................................ 2008-037077

(51) Int. Cl.
*G06K 9/00* (2006.01)
(52) U.S. Cl. ........ 382/125; 382/115; 382/173; 382/181; 382/276; 707/736; 707/758
(58) Field of Classification Search .................. None
See application file for complete search history.

(56) References Cited

U.S. PATENT DOCUMENTS

| | | | |
|---|---|---|---|
| 4,646,352 A * | 2/1987 | Asai et al. ..................... | 382/125 |
| 5,040,223 A | 8/1991 | Kamiya et al. | |
| 5,613,014 A * | 3/1997 | Eshera et al. .................. | 382/124 |
| 5,892,838 A * | 4/1999 | Brady ........................... | 382/115 |
| 6,185,318 B1 * | 2/2001 | Jain et al. ...................... | 382/125 |
| 6,766,040 B1 * | 7/2004 | Catalano et al. .............. | 382/115 |

(Continued)

FOREIGN PATENT DOCUMENTS

JP         01-283674 A          11/1989
(Continued)

OTHER PUBLICATIONS

Tong et al, "Fingerprint Minutiae Matching Using Adjacent Feature Vector", China, 2006.*

(Continued)

*Primary Examiner* — Apu Mofiz
*Assistant Examiner* — Hung Le
(74) *Attorney, Agent, or Firm* — Sughrue Mion, PLLC

(57) ABSTRACT

When a false matching rate depends on data for evaluation, there is a possibility that the accuracy of pattern authentication could deteriorate in an actual operation. A pattern verification apparatus includes a correction value calculation unit that generates a plurality of unit area pairs by associating each of a plurality of unit areas generated by dividing a second pattern with each of a plurality of unit areas generated by dividing a first pattern according to a degree of similarity of a pattern, and calculates a correction value, which is suitable for matching or approximating unique feature values of the respective unit areas of the mutually associated unit areas, on the unit area pair basis; a difference value calculation unit that calculates a difference value indicating a difference between the correction values based on a comparison of the correction values between the unit area pairs that are positioned spatially adjacent to each other; and a verification evaluation value calculation unit that calculates a verification evaluation value according to a verification result between a condition indicating that patterns belong to mutually different categories and a plurality of difference values calculated by the difference value calculation unit.

18 Claims, 15 Drawing Sheets

U.S. PATENT DOCUMENTS

| | | | | |
|---|---|---|---|---|
| 6,836,554 | B1 * | 12/2004 | Bolle et al. | 382/116 |
| 7,046,829 | B2 * | 5/2006 | Udupa et al. | 382/124 |
| 2001/0036300 | A1 * | 11/2001 | Xia et al. | 382/125 |
| 2004/0013287 | A1 * | 1/2004 | Takeuchi et al. | 382/124 |
| 2004/0151346 | A1 * | 8/2004 | Weiss | 382/115 |
| 2005/0058325 | A1 * | 3/2005 | Udupa et al. | 382/125 |
| 2010/0027852 | A1 * | 2/2010 | Hsieh et al. | 382/115 |

FOREIGN PATENT DOCUMENTS

| | | |
|---|---|---|
| JP | 06-274602 A | 9/1994 |
| JP | 09-167230 A | 6/1997 |
| JP | 2001-021309 A | 1/2001 |
| JP | 2001-092963 A | 4/2001 |
| JP | 2002-288667 A | 10/2002 |
| JP | 2002-298141 A | 10/2002 |
| JP | 2005-149455 A | 6/2005 |
| JP | 2006-018578 A | 1/2006 |

OTHER PUBLICATIONS

Jain et al, "An Identity-Authentication System Using Fingerprints", IEEE, pp. 1635-1388, 1997.*

Lawrence O'Gorman, "2 Fingerprint Verification", Veridicom Inc, NJ, 1999.*

Jain et al, "Filterbank-Based Fingerprint Matching", IEEE, 2000.*

Jiang et al, "Fringerprint Minutiae Matching Based on the Local and Global Structures", IEEE, 2000.*

Ng et al, "Adjacent Orientation Vector Based Fingerprint Minutiae Matching System", IEEE, 2004.*

We et al, "Fingerprint Image Enhancement Method Using Directional Median Filter", Preprint submitted to Elsevier Science, 2004.*

Pankanti et al, "On the Individuality of Fingerprints", 2001.*

Ryu et al, "A Fast Fingerprint Matching Algorithm using Parzen Density Estimation", 2004.*

Senior et al, "Improved Fingerprint Matching by Distortion Removal", IEICE Trans. Inf. & Syst., vol. E84-D, No. 7, 2001.*

Wan et al, "Fingerprint Recognition Using Model-based Density Map", IEEE, 2004.*

A. Monden, et al., "Fingerprint Verification Assuring the Security Strength of Individual Fingerprints," The 2007 Symposium on Cryptography and Information Security, Jan. 23-26, 2007, pp. 1-6.

* cited by examiner

| PAIR NUMBER | INPUT FINGERPRINT PATTERN | TEMPLATE FINGERPRINT PATTERN |
|---|---|---|
| 1 | R1 | Ra |
| 2 | R2 | Rb |
| 3 | R3 | Rc |
| 4 | R4 | Rd |
| 5 | R5 | Re |
| 6 | R6 | Rf |

PATTERN VERIFICATION APPARATUS, PATTERN VERIFICATION METHOD, AND PROGRAM

TECHNICAL FIELD

The present invention relates to a pattern verification apparatus, a pattern verification method, and a program.

BACKGROUND ART

In recent years, enhancement of information security has been strongly desired from a viewpoint of protecting personal information. In particular, biometric authentication technologies such as fingerprint authentication and vein authentication have been attracting attention. This is because disguising a pattern is very difficult in the biometric authentication, and because its resistance to the pattern disguising is superior.

In the pattern matching in which two patterns are determined to belong to the same category or not, there are cases where two patterns that should be determined to belong to different categories are mistakenly determined to belong to the same category. Therefore, in such pattern matching, it is strongly desired to reduce the probability that an incorrect determination is made (false matching rate) below a predetermined value. In other words, it is desired to reduce a false accept rate (FAR), i.e., a rate at which a wrong person is mistakenly accepted, below a predetermined value that is acceptable in the system.

In pattern matching, in general, in order to determine whether two patterns belong to the same category or not, a verification evaluation value such as a distance and the degree of similarity between two patterns is calculated, and then the final determination is made based on a verification result between the verification evaluation value and a determination threshold. When the determination threshold is set to be a strict value, the false matching rate becomes smaller. However, the probability that patterns belonging to the same category are mistakenly determined to belong to different categories becomes higher. When the determination threshold is loosened, the probability that patterns belonging to the same category are mistakenly determined to belong to different categories becomes smaller. However, the false matching rate becomes larger. Therefore, it is necessary to set the determination threshold such that a desired matching accuracy is obtained.

However, when there is no theoretical relation between the verification evaluation value and the false matching rate, it becomes necessary to prepare a database for evaluation, specify a relation between the verification evaluation value and the false matching rate by experiments using the database, and specify a determination threshold.

Non-patent document 1 describes problems that arise when the threshold is obtained experimentally. Non-patent document 1 mentions that when a relation between the verification evaluation value and the false matching rate is obtained as the average performance of data for evaluation by an experiment using a database for evaluation, there are two problems, i.e., variations among each data and database dependence.

The problem of the variations among each data means a problem that the probability of occurrence of false matching varies depending on the data. Even if the average false matching rate is lower than a predetermined value, there is a possibility, depending on data, that there is data for which the false matching rate is higher than the predetermined value. Such data does not satisfy the desired level of safety.

The problem of the database dependence means a problem that when evaluation is made experimentally, the evaluation result depends on the data that was used for the experiment. Data used in an actual operation is different from the data for evaluation. Therefore, if the data depends on the evaluation result, performance in an actual operation cannot be predicted from the result of an evaluation experiment using data for evaluation.

Patent document 1 addresses the problem of variations among each data by defining a threshold for each data by an experiment. In Patent document 2, when matching is to be performed, comparisons with both the data of the person himself/herself and the data of a different person are performed and a verification result is determined based on the degree of similarity of each comparison. By doing so, Patent document 2 addresses the problem of variations among each data.

In Non-patent document 1 and Patent document 3, the false matching rate is theoretically evaluated by using a probability in which feature points match with each other by coincidence. By doing so, Non-patent document 1 and Patent document 3 address both the problem of variations among each data and the problem of database dependence.

Note that Patent documents 4 to 7 also disclose known techniques. Patent document 4 discloses a technique to emphasize ridge lines. Patent document 5 discloses a method and an apparatus capable of performing image matching at a high speed with high accuracy even for an input image in a state where the orientation of an authentication sample or the like is different from the model image. Patent document 6 discloses a technique that enables an input figure to be precisely distinguished even when the input figure is deformed. Patent document 7 discloses a technique that can speed up comparison processing.

[Non Patent Document 1]
"Fingerprint Verification Assuring the Security Strength of Individual Fingerprints" Proceedings of the Symposium on Cryptography and Information Security (SCIS2007), January 2007
[Patent Document 1]
Japanese Unexamined Patent Application Publication No. 2001-21309
[Patent Document 2]
Japanese Unexamined Patent Application Publication No. 2006-18578
[Patent Document 3]
Japanese Unexamined Patent Application Publication No. 2002-288667
[Patent Document 4]
Japanese Unexamined Patent Application Publication No. 9-167230
[Patent Document 5]
Japanese Unexamined Patent Application Publication No. 2001-92963
[Patent Document 6]
Japanese Unexamined Patent Application Publication No. 2002-298141
[Patent Document 7]
Japanese Unexamined Patent Application Publication No. 2005-149455

DISCLOSURE OF INVENTION

Technical Problem

As obvious from the above explanation, when the false matching rate depends on data for evaluation, there is a possibility that pattern authentication could not be implemented with a desired accuracy in an actual operation.

An object of the present invention is to implement pattern authentication with a desired accuracy in an actual operation by enabling the false matching rate to be evaluated irrespective of data for evaluation.

Technical Solution

A pattern verification apparatus in accordance with a first aspect of the present invention includes: a correction value calculation unit that generates a plurality of unit area pairs by associating each of a plurality of unit areas generated by dividing a second pattern with each of a plurality of unit areas generated by dividing a first pattern according to a degree of similarity of a pattern, and calculates a correction value, which is suitable for matching or approximating unique feature values of the respective unit areas of the mutually associated unit areas, on the unit area pair basis; a difference value calculation unit that calculates a difference value indicating a difference between the correction values based on a comparison of the correction values between the unit area pairs that are positioned spatially adjacent to each other; and a verification evaluation value calculation unit that calculates a verification evaluation value according to a verification result between a condition indicating that patterns belong to mutually different categories and a plurality of difference values calculated by the difference value calculation unit.

A pattern verification method in accordance with a first aspect of the present invention is a pattern verification method to perform pattern matching, including: a correction value calculation unit of a computer generates a plurality of unit area pairs by associating each of a plurality of unit areas generated by dividing a second pattern with each of a plurality of unit areas generated by dividing a first pattern according to a degree of similarity of a pattern, and calculates a correction value, which is suitable for matching or approximating unique feature values of the respective unit areas of the mutually associated unit areas, on the unit area pair basis; a difference value calculation unit of the computer calculates a difference value indicating a difference between the correction values based on a comparison of the correction values between the unit area pairs that are positioned spatially adjacent to each other; and a verification evaluation value calculation unit of the computer calculates a verification evaluation value according to a verification result between a condition indicating that patterns belong to mutually different categories and a plurality of difference values calculated by the difference value calculation unit.

A program in accordance with a first aspect of the present invention is a program that causes a computer to perform pattern matching, the program causing the computer to: generate a plurality of unit area pairs by associating each of a plurality of unit areas generated by dividing a second pattern with each of a plurality of unit areas generated by dividing a first pattern according to a degree of similarity of a pattern, and calculates a correction value, which is suitable for matching or approximating unique feature values of the respective unit areas of the mutually associated unit areas, on the unit area pair basis; calculate a difference value indicating a difference between the correction values based on a comparison of the correction values between the unit area pairs that are positioned spatially adjacent to each other; and calculate a verification evaluation value according to a verification result between a condition indicating that patterns belong to mutually different categories and a plurality of difference values calculated by the difference value calculation unit.

Advantageous Effects

By enabling the false matching rate to be evaluated irrespective of data for evaluation, it is possible to realize pattern authentication with a desired accuracy in an actual operation.

EXPLANATION OF REFERENCE

50 PATTERN VERIFICATION APPARATUS
100 FIRST PATTERN INPUT UNIT
200 SECOND PATTERN INPUT UNIT
300 COMPUTER
301 AREA DIVISION UNIT
302 AREA DIVISION UNIT
303 CORRECTION VALUE CALCULATION UNIT
304 DIFFERENCE VALUE CALCULATION UNIT
305 DISTRIBUTION STORAGE UNIT
306 DIFFERENCE VALUE EVALUATION UNIT
307 DETERMINATION UNIT
400 OUTPUT UNIT

BEST MODE FOR CARRYING OUT THE INVENTION

First Exemplary Embodiment

Figure 1:
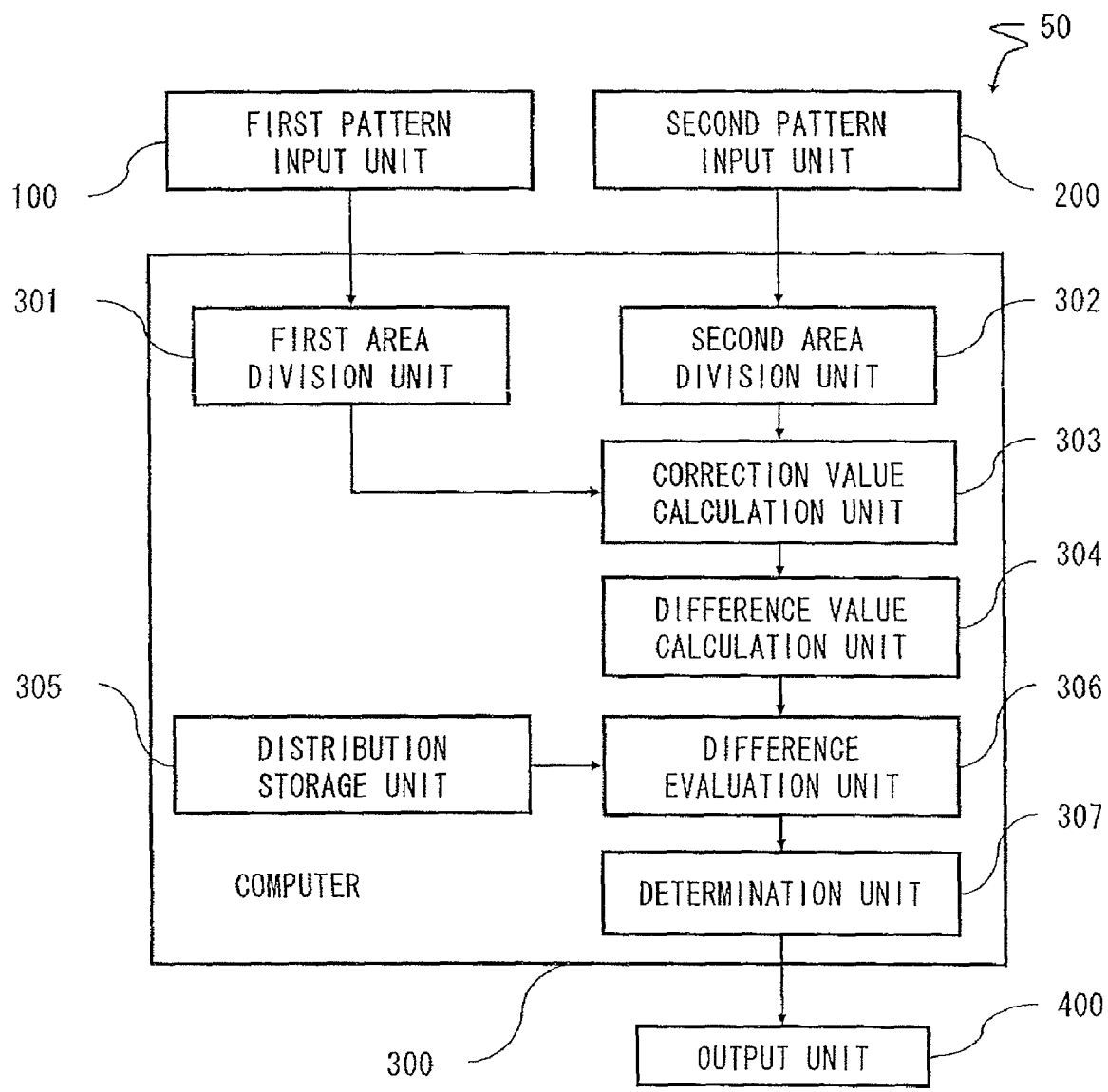
FIG. 1 is a block diagram showing a schematic configuration of a pattern verification apparatus in accordance with a first exemplary embodiment of the present invention.
Figure 2:
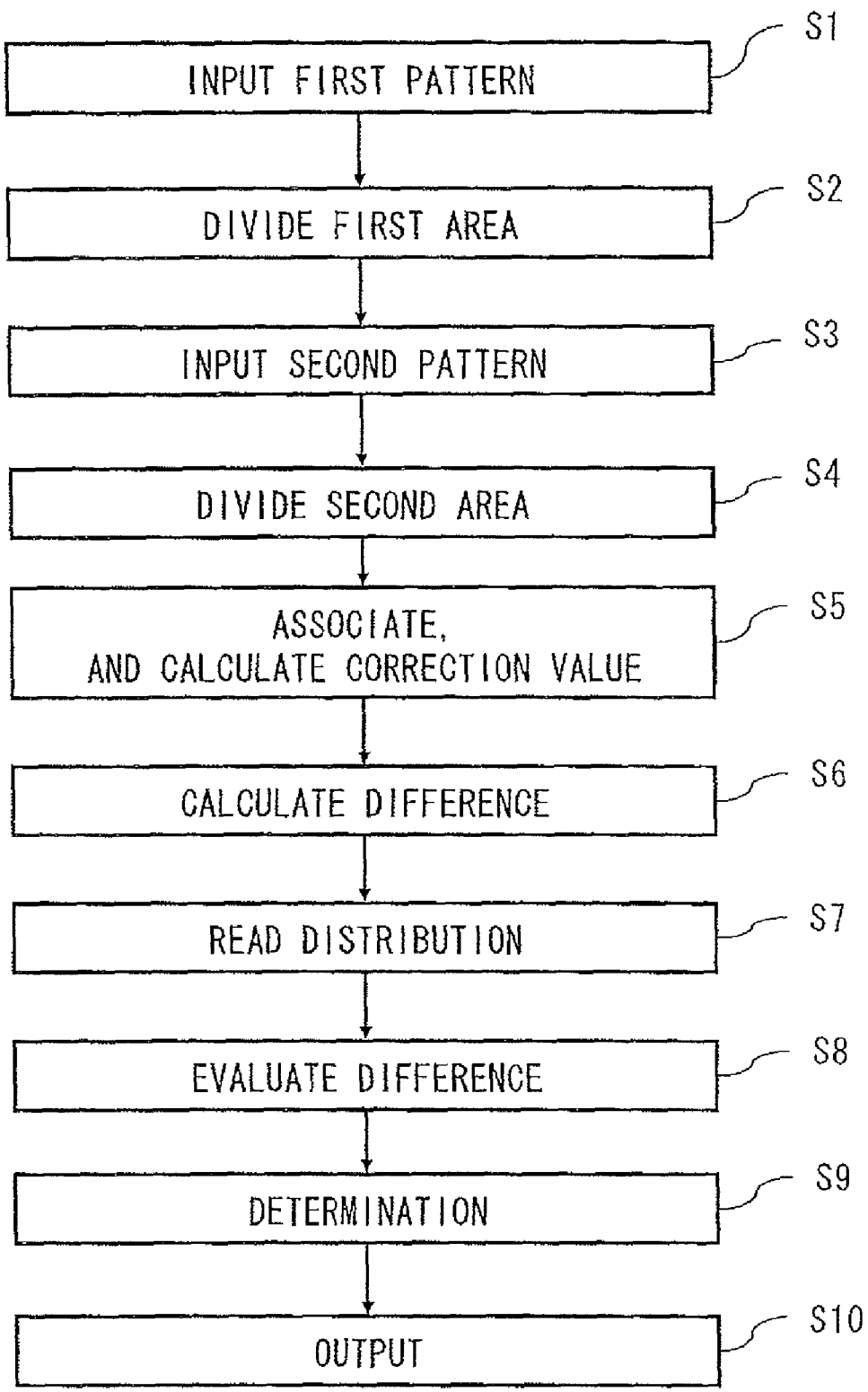
FIG. 2 is a flowchart for explaining an operation of a pattern verification apparatus in accordance with a first exemplary embodiment of the present invention.

A first exemplary embodiment of the present invention is explained hereinafter with reference to FIGS. 1 and 2. FIG. 1 is a block diagram showing a schematic configuration of a pattern verification apparatus. FIG. 2 is a flowchart for explaining an operation of a pattern verification apparatus.

As shown in FIG. 1, a verification device 50 includes a first pattern input unit 100, a second pattern input unit 200, a computer 300, and an output unit 400. The computer 300 is a computing device in which a program is sequentially executed in a CPU core so that desired functions are implemented.

The computer 300 includes a first area division unit (division unit, division means) 301, a second area division unit (division unit, division means) 302, a correction value calculation unit (correction value calculation unit, correction value calculation means) 303, a difference value calculation unit (difference value calculation unit, difference value calculation means) 304, a distribution storage unit 305, a difference value evaluation unit (matching evaluation calculation unit, matching evaluation calculation unit) 306, and a determination unit (determination unit, determination means) 307.

An operation of each of the above-described components is explained with reference to FIG. 2.

Firstly, the first pattern input unit 100 inputs a first pattern of a verification object to the computer 300 (S1). Next, the first area division unit 301 divides the first pattern and thereby generates a plurality of small areas (S2). Next, the second pattern input unit 200 inputs a second pattern of a verification object to the computer 300 (S3). Next, the second area division unit 302 divides the second pattern and thereby generates a plurality of small areas (S4).

For example, the first pattern is a biological information pattern collected from a subject by using a pattern detector (such as a fingerprint sensor). For example, the second pattern is a biological information pattern that is registered in advance in an external or internal storage area.

Next, the correction value calculation unit 303 generates pairs of small areas by associating each of the small areas of the first pattern with each of the small areas of the second pattern, and calculates a correction value that is for matching respective feature values of the small areas forming a pair of small areas (S5). Next, the difference value calculation unit 304 calculates a difference value between correction values of two small area pairs positioned spatially adjacent to each other in units of plural small area pairs (S6). Next, the difference value evaluation unit 306 reads out an occurrence distribution of difference values that is obtained when patterns belonging to different categories are compared from the distribution storage unit 305 (S7). Next, the difference value evaluation unit 306 evaluates each of a plurality of difference values obtained by the difference value calculation unit 304 with the read-out occurrence distribution (S8). Then, the difference value evaluation unit 306 obtains a verification evaluation value between the first and second patterns according to this evaluation result. Next, the determination unit 307 determines whether or not the first and second patterns are patterns belonging to the same category based on the comparison between the verification evaluation value and a threshold. Next, the output unit 400 outputs a determination result.

By adopting this configuration, it is possible to improve the reliability of pattern matching. This feature is explained in a more concrete manner in the following explanation about a first exemplary example.

First Exemplary Example

Figure 3:
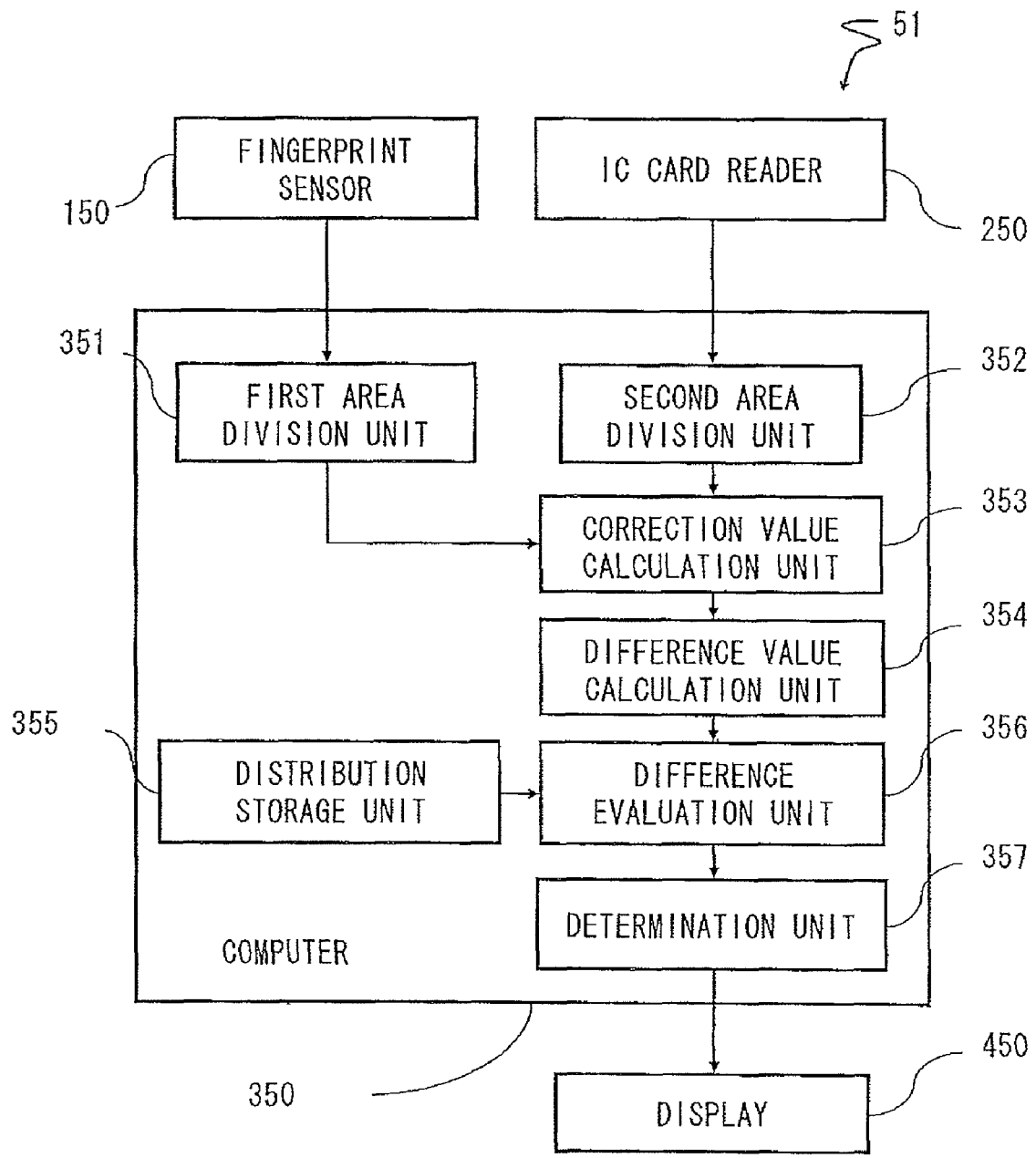
FIG. 3 is a schematic block diagram showing a configuration of a pattern verification apparatus in accordance with a first exemplary example of the present invention.
Figures 4, 5:
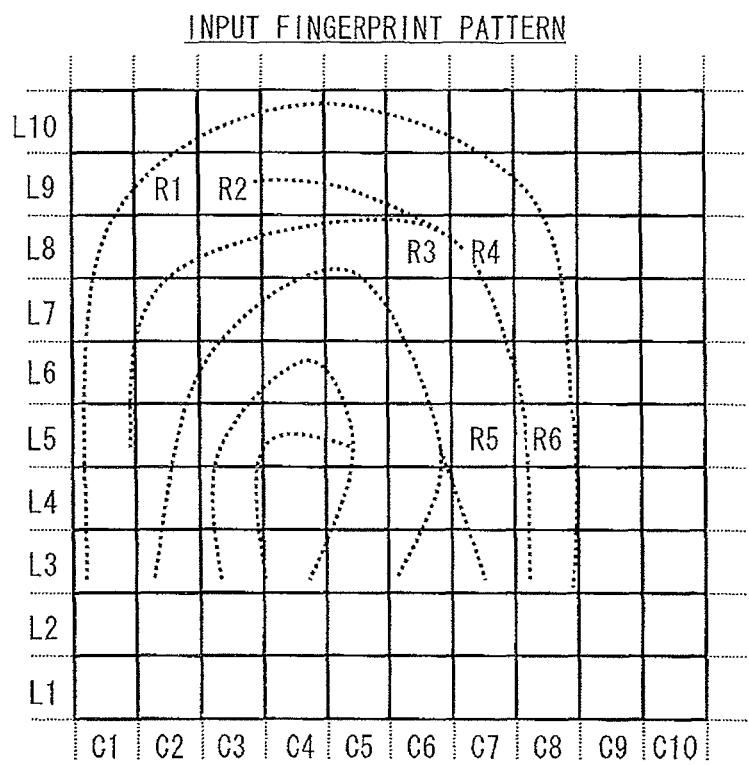
FIG. 4 is an explanatory diagram for explaining a division method by a division unit in accordance with a first exemplary example of the present invention.
FIG. 5 is an explanatory diagram for explaining an input fingerprint pattern divided into compartments in accordance with a first exemplary example of the present invention.
Figures 6, 7:
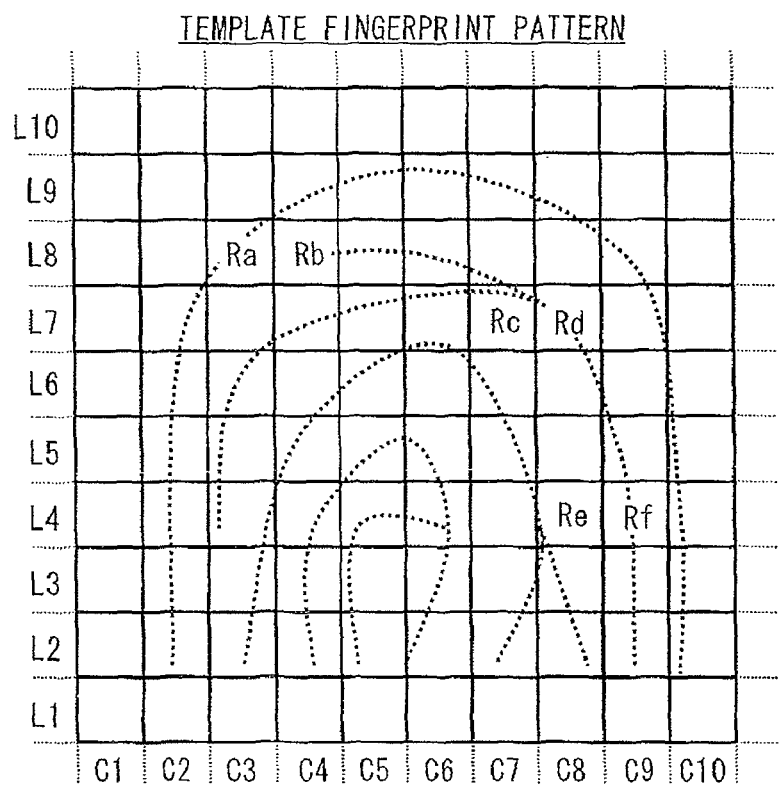
FIG. 6 is an explanatory diagram for explaining a template fingerprint pattern divided into compartments in accordance with a first exemplary example of the present invention.
FIG. 7 is an explanatory diagram showing a correspondence relation between small areas that form a small area pair in accordance with a first exemplary example of the present invention.
Figure 8:
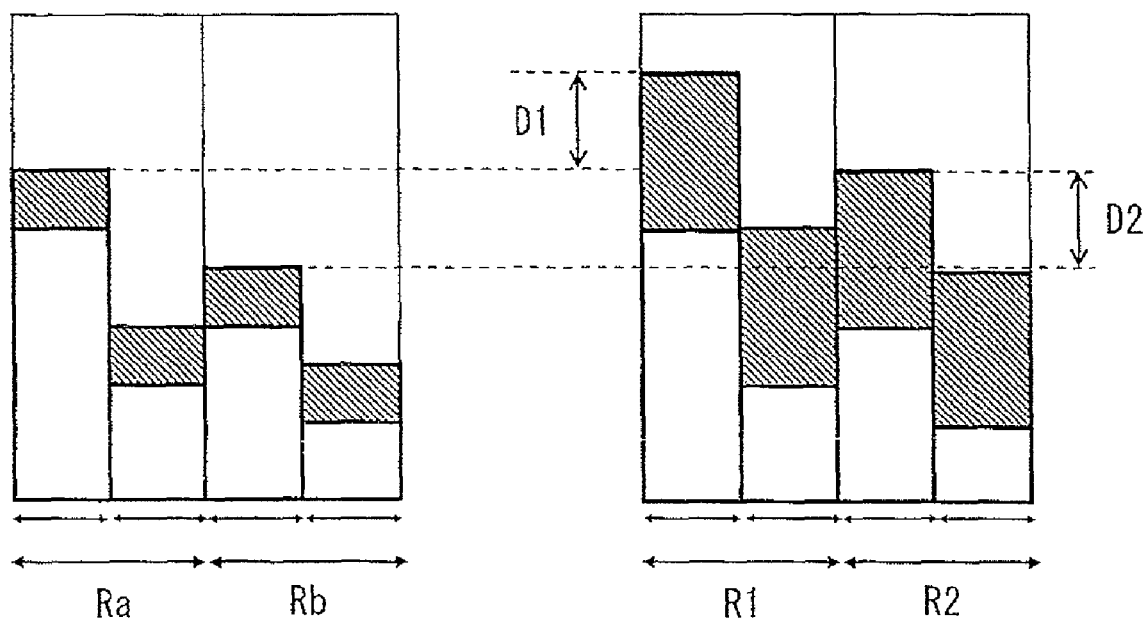
FIG. 8 is an explanatory diagram for explaining changes of feature values due to a change of the fingerprinting pressure in accordance with a first exemplary example of the present invention.
Figure 9A:
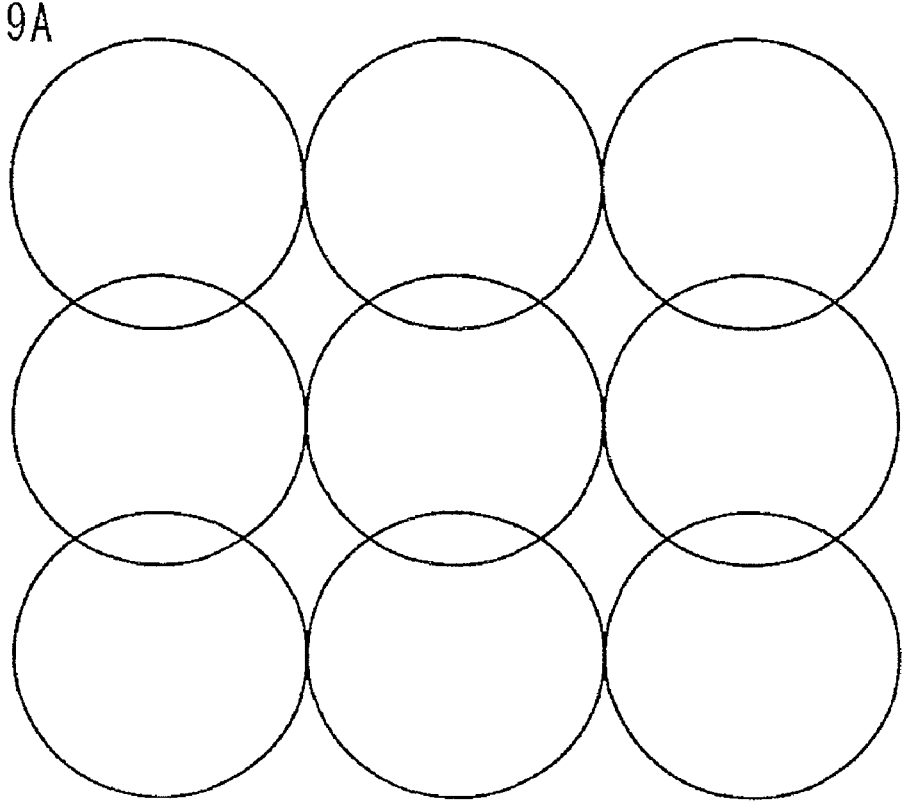
FIG. 9A is an explanatory diagram for explaining various kinds of division methods in accordance with a first exemplary example of the present invention.
Figure 9B:
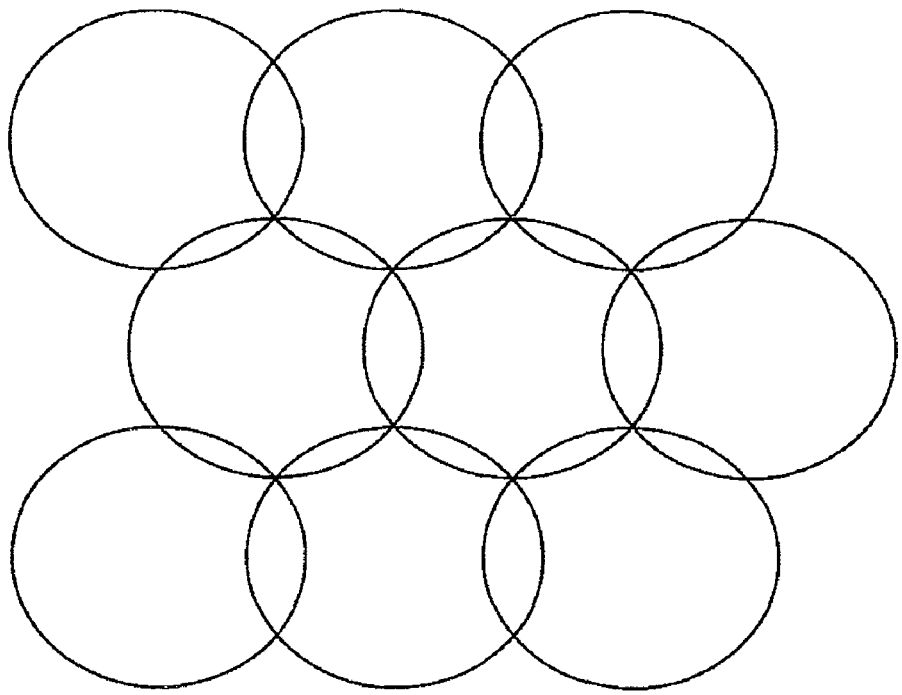
FIG. 9B is an explanatory diagram for explaining various kinds of division methods in accordance with a first exemplary example of the present invention.

A first exemplary example is explained with reference to FIGS. 3 to 9B. FIG. 3 is a schematic block diagram showing a configuration of a pattern verification apparatus. FIG. 4 is an explanatory diagram for explaining a division method by a division unit. FIG. 5 is an explanatory diagram for explaining an input fingerprint pattern divided into compartments. FIG. 6 is an explanatory diagram for explaining a template fingerprint pattern divided into compartments. FIG. 7 is an explanatory diagram showing a correspondence relation between small areas that form a small area pair. FIG. 8 is an explanatory diagram for explaining changes of feature values due to a change of the fingerprinting pressure. FIGS. 9A and 9B are explanatory diagrams for explaining various kinds of division methods.

In this exemplary example, it is determined whether a user is an authorized person or not in the following manner. A fingerprint pattern of an authorized person is registered in advance as a template fingerprint in an IC card. Then, it is determined whether or not input fingerprint pattern data belongs to the category of a fingerprint pattern that is obtained from the same finger as that of the template fingerprint registered in the IC card.

Note that in pattern verification, it is rare that patterns to be compared completely match with each other. Therefore, the determination whether both patterns match with each other or not is made based on whether they belong to the same category or not. Then, based on this determination result, the matching device determines whether the user is the authorized person or not.

As shown in FIG. 3, the pattern verification apparatus 51 includes a fingerprint sensor 150, an IC card reader 250, and a display 450. Note that the fingerprint sensor 150 functions as the first pattern input unit 100. The IC card reader 250 functions as the second pattern input unit 200. The display 450 functions as the output unit 400.

The computer 350 includes a first area division unit 351, a second area division unit 352, a correction value calculation unit 353, a difference value calculation unit 354, a distribution storage unit 355, a difference value evaluation unit 356, and a determination unit 357.

A function of the pattern verification apparatus 51 is explained with reference to FIGS. 4 to 8. Assume that a user who wants to be authenticated as an authorized person inserts an IC card in which a fingerprint pattern of the authorized person is registered into the IC card reader 250 and puts his/her finger on the fingerprint sensor 150.

Firstly, the fingerprint sensor 150 reads out an input fingerprint pattern. Note that the fingerprint sensor 150 used in this example is a capacitance sensor in which a plurality of detection electrodes are positioned in a matrix pattern. The output values output from the fingerprint sensor 150 in correspondence with respective detection electrodes vary in its value according to the fingerprinting pressure against the fingerprint sensor 150. Therefore, the values obtained by the fingerprint sensor 150 in correspondence with respective detection electrodes, are values obtained by adding variation values in accordance with the fingerprinting pressure to the fixed values corresponding to the fingerprint pattern.

Next, the first area division unit 351 divides the input fingerprint pattern into small areas (unit areas) in a predetermined division method. Here, as shown in FIG. 4, the first division unit 351 divides the image area of the input fingerprint pattern by a plurality of axis lines and thereby creates a tetragonal lattice (small areas) arranged in a matrix pattern. Each area of the tetragonal lattice is specified by coordinate information defined by rows L1 to L10 and columns C1 to C10.

Next, the IC card reader 250 reads out a template fingerprint pattern from the IC card in which the fingerprint pattern of the authorized person has been registered.

Next, the second area division unit 352 divides the template fingerprint pattern into small areas in a predetermined division method. In this example, as shown in FIG. 6, the second area division unit 352 divides the image area of the template fingerprint pattern by a plurality of axis lines and thereby creates a tetragonal lattice (small areas) arranged in a matrix pattern. Each area of the tetragonal lattice is specified by coordinate information defined by rows L1 to L10 and columns C1 to C10. Here, the second area division unit 352 divides the image area of the template fingerprint pattern in accordance with the division rule of the first area division unit 351.

Next, the correction value calculation unit 353 associates areas having a high pattern correlation with each other between the small areas of the input fingerprint pattern and those of the template fingerprint pattern, and thereby creates pairs of small areas (unit area pairs). After that, the correction value calculation unit 353 calculates a correction values for matching feature values of respective small areas forming the small area pair.

For example, the correction value calculation unit 353 performs the following processing.

Firstly, the correction value calculation unit 353 calculates a mutual correlation coefficient between a small area R1 of the input fingerprint pattern shown in FIG. 5 and each small area of the template fingerprint pattern shown in FIG. 6. That is, the correction value calculation unit 353 specifies a small area having a grayscale distribution that resembles that of the small area R1 better than any other small areas among the small areas forming the template fingerprint pattern. Then, the correction value calculation unit 353 mutually associates the small area R1 with the specified small area and thereby creates a pair of small areas.

The correction value calculation unit 353 also performs the above-described processing for other small areas of the input fingerprint pattern shown in FIG. 5. With this series of processes by the correction value calculation unit 353, each of the small areas of the input fingerprint pattern and each of the small areas of the template fingerprint pattern is associated with each other.

Supplementary explanation of this feature is made hereinafter with reference to FIG. 7. As shown in FIG. 7, the small area R1 and the small area Ra form a small area pair having a pair number 1. The small area R2 and the small area Rb form a small area pair having a pair number 2. The small area R3 and the small area Rc form a small area pair having a pair number 3. The small area R4 and the small area Rd form a small area pair having a pair number 4. The small area R5 and the small area Re form a small area pair having a pair number 5. The small area R6 and the small area Rf form a small area pair having a pair number 6. Other small areas are also mutually associated between the input fingerprint pattern and the template fingerprint pattern in a similar manner. Note that as obvious from the fingerprint pattern that is schematically shown in FIGS. 5 and 6, small areas that are associated with each other have high pattern relevance.

Next, the correction value calculation unit 353 calculates a correction value for matching feature values of respective small areas forming a small area pair.

The input fingerprint pattern and the template fingerprint pattern are not completely identical patterns due to various factors such as variations in the sensor gain at the time of input, positional deviation, and deformation even when they are obtained from the same finger. Therefore, it is necessary to make some correction to match feature values between small areas forming a pair. A correction value of a feature value is obtained for small areas forming a pair.

If a sensor in which the density of an obtained fingerprint pattern varies from one place to another due to the fingerprinting pressure of a finger is used, the density of a fingerprint pattern varies from one place to another depending on how the finger is pressed. Therefore, the density of patterns is different between the small areas forming a pair. To conform the density of both patterns to each other, it is necessary to adjust density of at least one of the patterns. Note that the density corresponds to an output value from the fingerprint sensor.

A method of determining a correction value is explained in a concrete manner. The correction value calculation unit 353 compares the density dR1 of the small area R1 of FIG. 5 (a feature value according to a distance between a finger of a subject and a detection electrode corresponding to the small area R1 at the time when the input fingerprint pattern is obtained) with the density dRa of the small area Ra of FIG. 6 (a feature value according to a distance between a finger of a subject and a detection electrode corresponding to the small area Ra at the time when the template fingerprint pattern is obtained), and thereby calculates a correction value that is used to substantially match or approximate both of them. The correction value is a value that is used to match the density in the small area Ra with the density in the small area R1, and is calculated by comparing their values.

A specific example is shown below. The correction value calculation unit 353 calculates dR1/dRa and dR2/dRb. For example, dR1/dRa=1.2 and dR2/dRb=1.1. In this way, a correction value is calculated for each small area pair by the correction value calculation unit 353.

Next, the difference value calculation unit 354 calculates a difference value between correction values among a plurality of adjacent areas. Specifically, the difference value calculation unit 354 calculates a difference value from correction values of small area pairs that are related as being positioned adjacent to each other.

As obvious from FIGS. 5 and 6, the small area pair having a pair number 1 is positioned adjacent to small area pair having a pair number 2. Since the small area pair having the pair number 1 and the small area pair having the pair number 2 are positioned adjacent to each other, the difference value calculation unit 354 calculates a difference value between a correction value calculated from the small area pair having the pair number 1 and that from the small area pair having the pair number 2. That is, the difference value calculation unit 354 performs dR1/dRa-dR2/dRb. Similarly, the difference value calculation unit 354 also performs dR3/dRc-dR4/dRd. The difference value calculation unit 354 also performs dR5/dRe-dR6/dRf. Similarly, the difference value calculation unit 354 calculates difference values between correction values calculated from small area pairs having different pair numbers. In this way, the difference value calculation unit 354 calculates a difference value from correction values of small area pairs that are positioned adjacent to each other.

The reason for calculating difference values by the difference value calculation unit 354 is explained hereinafter.

As described above, in this exemplary example, the output values output from the fingerprint sensor 150 in correspondence with detection electrodes vary in their values in accordance with the fingerprinting pressure of a finger against the fingerprint sensor 150. That is, the values obtained by the fingerprint sensor 150 in correspondence with respective detection electrodes are values obtained by adding variation values, which varies in accordance with the fingerprinting pressure, to the fixed values that corresponds to the fingerprint pattern. Therefore, even if an identical fingerprint pattern is being detected, the output values output from the fingerprint sensor 150 vary according to the fingerprinting pressure of the finger on the fingerprint sensor 150.

That is, even if an image of the same portion of the finger is captured by the fingerprint sensor 150, there is a possibility that different values are output from the fingerprint sensor 150 between the registered fingerprint pattern and the input fingerprint pattern. More specifically, even if an image of the same portion of the finger is captured by the fingerprint sensor 150, there is a possibility that the density values in the small areas R1 and R2 could become larger than those in the small areas Ra and Rb as shown in FIG. 8. Note that the hatched portions represent the portions whose values are changed due to the fingerprinting pressure of a finger on the fingerprint sensor 150.

According to the variation of the fingerprinting pressure, the density value in the small area R1 is increased by D1 compared to that in the small area Ra. Similarly, the density value in the small area R2 is increased by D2 compared to that in the small area Rb. Note that D1 and D2 correspond to the above-described correction values. Further, D1-D2 corresponds to the above-described difference value.

As described above, the fingerprinting pressure varies from one measurement to another, and could be various values when viewed in the entire finger. However, since a finger is an elastic body, the local change of the fingerprinting pressure is gentle. That is, it is presumed that correction values of small area pairs that are positioned spatially adjacent to each other have values mutually close to each other. Therefore, a difference value between correction values of small area pairs that are positioned spatially adjacent to each other has a small value. In the case of dR1/dRa=1.2 and dR2/dRb=1.1, a difference value between them becomes a small value, i.e., 0.1.

Similarly, the difference value calculation unit 354 also obtains difference values between correction values of other small area pairs that are positioned adjacent to each other. By calculating difference values between correction values of small area pairs that are positioned spatially adjacent to each other, it is possible to prevent an error from occurring in the final determination result due to variations of the fingerprinting pressure.

Next, the difference value evaluation unit 356 evaluates a plurality of difference values calculated by the difference value calculation unit 354 based on an occurrence distribution of difference values that is obtained when patterns belonging to different categories are compared and is stored in advance in the distribution storage unit 355, and calculates a verification evaluation value having a value according to this evaluation result.

The occurrence distribution of difference values of correction values, which are observed between adjacent small areas when patterns belonging to different categories are compared with a template fingerprint pattern, can be obtained theoretically and experimentally from the property of patterns that is to be a verification object.

This is because when different patterns are compared, a difference value between correction values of adjacent small areas is affected more strongly by the difference between patterns themselves than by the change of the fingerprinting pressure. Therefore, considering this feature, when patterns belonging to different categories are compared with a template fingerprint pattern, difference values are presumed to appear uniformly as random numbers. Therefore, an occurrence distribution, which conditions a spatial and value distribution of the random number values, may be stored in the distribution storage unit 355. The difference value evaluation unit 356 evaluates the plurality of difference values calculated by the difference value calculation unit 354 by comparing them with an occurrence distribution stored in advance in the distribution storage unit 355.

Note that the occurrence distribution stored in the distribution storage unit 355 is arbitrarily determined according to the type of patterns that is to be a verification object, and may not necessarily be a uniform distribution of random numbers.

A function of the difference value evaluation unit 356 is further explained in a supplemental manner by using a simple example. Assume a case where a difference value calculated by the difference value calculation unit 354 is 5 between each correction value of the small area pair having a pair number 1 and the small area pair having a pair number 2 shown in FIG. 7; is 5 between each correction value of the small area pair having a pair number 3 and the small area pair having a pair number 4; and is 50 between each correction value of the small area pair having a pair number 5 and the small area pair having a pair number 6. Further, assume that condition data stored as an occurrence distribution in the distribution storage unit 35 is uniform random numbers that are uniformly distributed over a range from 0 to 50.

The difference value evaluation unit 356 evaluates a difference value between each correction value of the small area pair having the pair number 1 and the small area pair having the pair number 2 as 0.1. Similarly, the difference value evaluation unit 356 evaluates a difference value between each correction value of the small area pair having the pair number 3 and the small area pair having the pair number 4 as 0.1. The difference value evaluation unit 356 evaluates a difference value between each correction value of the small area pair having the pair number 5 and the small area pair having the pair number 6 as 0.9. If explanation is made only for this range, the difference value evaluation unit 356 calculates 0.1×0.1×0.9=0.009 as a verification evaluation value.

If the difference value is large, it is presumed that the variation of the fingerprinting pressure of a finger on the fingerprint sensor 150 is large. Even in such a case, the difference value having a large value has a value close to 1 based on the evaluation result by the difference value evaluation unit 356. Therefore, when the verification evaluation value is calculated in the above-described manner, the influence by a large difference value is eliminated. That is, even if a defect occurs in the pattern to be obtained due to a large noise superimposed on a part of the finger or the like, its influence can be eliminated by the evaluation performed by the difference value evaluation unit.

Note that a specific method of evaluating a difference value by the difference value evaluation unit 356 can be arbitrarily determined. An evaluation method in which an event that is determined by N small area pairs positioned adjacent to each other (N is a natural number equal to or larger than two) becomes smaller than an event that is defined as a determination condition is expressed by the following relational expressions.

$Ri < Di (i=1 \text{ to } N)$ (Relational expression 1)

$\pi Ri < \pi Di\ (i=1 \text{ to } N)$ (Relational expression 2)

$Ri' < Di' (i=1 \text{ to } N),$ (Relational expression 3)

where Di is rearranged as $D1' < D2' < \ldots < DN'$, and Ri is rearranged as $R1' < R2' < \ldots < RN'$ Note that R1 is a value that is caused to occur based on an occurrence probability stored in the distribution storage unit 355, and Di is a difference value calculated from each small area of the template fingerprint pattern and each small area of the input fingerprint pattern. N is a natural number equal to or larger than two.

By evaluating a plurality of difference value output from the difference value calculation unit 304 by using either one of the relational expressions, the verification evaluation value can be stabilized even when a partial abnormality occurs in the pattern. More specifically, there is an advantage that a pattern belonging to the same category can be prevented from being mistakenly determined to be a pattern belonging to a different category.

Even if an abnormality occurs in a part of the pattern and thus the value of some Di among a plurality of calculated Di becomes very large, its influence becomes the same as the influence that is caused when their feature values do not exist. When different patterns are compared, the possibility that a large difference value occurs is high and the value that is determined by the evaluation result of a large Di becomes a value close to 1. Since a multiplication by 1 causes substantially no change in the overall value, the influence on the final calculated verification evaluation value caused by Di having a very large value is small. In other words, in such a case, Di having a very large value can be considered not to exist. Therefore, if the value of Di other than some Di having a very large value is sufficiently small, the value of the finally calculated verification evaluation value becomes a small value.

In contrast, in the method of evaluating the absolute value of a difference value, if an abnormality occurs in a part of the pattern and thus some Di have a very large value, the verification evaluation value may be strongly affected by it. For example, assume a case where the verification evaluation value is calculated based on the following relational expression.

$\Sigma Di*Di\ (i=1 \text{ to } N)$ (Relational expression 4)

In the case where a difference value is evaluated simply as a distance like this, if any one of Di has a very large value, the distance becomes very large even if other Di are sufficiently small.

By contrast, when difference values calculated as described above are evaluated and a verification evaluation value is obtained by multiplication of these evaluation values, the influence by an abnormal difference value can be eliminated and therefore an advantageous effect that the value of the verification evaluation value is stabilized can be obtained.

The determination unit 357 determines whether or not the input fingerprint pattern is the same as the template fingerprint pattern based on the evaluation result by the difference value evaluation unit 356. For example, when the verification evaluation value is smaller than a predetermined value T, the determination unit 357 determines that both patterns belong to the same category. When the verification evaluation value is larger than the predetermined value T, the determination unit 357 determines that both patterns belong to different categories.

Note that the probability T is a probability that a difference value, which is obtained by comparing a pattern belonging to a different category with a template fingerprint pattern, becomes smaller than the difference value of correction values between adjacent areas which is calculated by the difference value calculation unit 354. Therefore, the probability that, when compared with a pattern belonging to a different category, the difference value becomes smaller than the predetermined value and therefore the pattern belonging to different category is mistakenly determined to belong to the same category is T.

The determination result is displayed on the display 450 and whether the user has access permission or not is notified.

As obvious from the above explanation, in this exemplary example, (1) a plurality of small area pairs are generated by associating small areas having mutually similar patterns between a template fingerprint pattern and an input fingerprint pattern; (2) a correction value indicating a difference between unique feature values of small areas included in each small area pair is calculated on small area pair basis; (3) a plurality of difference values between correction values of small area pairs that are positioned spatially adjacent to each other are calculated; (4) the plurality of calculated difference values are evaluated by an occurrence distribution that is set in advance for the case of unsuccessful matching; and (5) a verification evaluation value according to this evaluation result is compared with a predetermined threshold.

Since the verification result does not depend on the evaluation data, authentication can be implemented with a desired accuracy in an actual operation. Further, even when a difference value that is calculated from a certain small area pair is widely deviated from the proper value due to some kind of factor, the verification evaluation value is still prevented from being significantly changed due to this cause. In this way, the occurrence of an error in the final determination result is effectively suppressed.

In the conventional method, in addition to the dependence of the verification result on the evaluation data, it has been necessary to perform comparisons multiple times for the registration and/or the authentication. In the methods disclosed in Patent documents 1 and 2, the statistic of verification results is obtained by performing comparisons with data for evaluation. Then, variations caused by data are addressed by changing evaluation for each data based on the statistic. To obtain the statistic, it is necessary to perform comparisons multiple times at the time of registration and/or authentication. If comparisons are performed enough times to obtain a statistic, it takes time for the registration and/or the authentication. Therefore, it cannot be used for application scenes in which registration and/or authentication need to be performed in a short time. If the number of times of the comparisons is reduced to shorten the time required for the registration and/or the authentication, a reliable statistic cannot be obtained and therefore a correct evaluation result cannot be obtained. In this exemplary embodiment, the evaluation by multiple experiments is unnecessary in the first place. Therefore, the above-described problem, which has been a conventional problem, can be effectively dissolved.

Further, in the conventional method, there is a problem that it cannot be applied to any method other than the feature point patterns. The methods of Non-patent document 1 and Patent document 3 address problems that the verification result depends on the evaluation data and a plurality of comparisons of solutions were necessary for registration and/or authentication, by evaluating the false matching rate theoretically. However, these methods can be used only for cases where feature point patterns are compared. For example, other type of patterns such as image patterns cannot be compared. In this exemplary embodiment, since a correction value indicating a difference between feature values is used in the comparison process, it can be applied to various types of feature values that are capable of defining a correction amount.

Note that, in this exemplary example, a fingerprint pattern is used as a pattern that is to be a verification object. As for the fingerprint pattern, an image of a fingerprint itself may be used. Alternatively, a pattern more suitable for the comparison may be obtained from a fingerprint image by emphasizing ridge lines or a similar manner (see Patent document 4).

Further, in this exemplary example, although the fingerprint sensor 150 is connected to the computer 350 as the first pattern input unit 100, the fingerprint sensor may be positioned in a different place and its data may be transmitted to the computer 350 through a network. Although the IC card reader 250 is connected to the computer 350 as the second pattern input unit 200, the IC card reader may be positioned in a different place and its data may be transmitted to the computer 350 through a network.

The first pattern input unit 100 and the second pattern input unit 200 may be configured such that a pattern is input when a user is authenticated in an input device such as a fingerprint sensor, or may be configured such that a pattern stored in advance in a given storage device such as an IC card, a hard disk drive, and a memory is input.

Further, the first area division unit 351 and the second area division unit 352 may be provided within the first pattern input unit 100 and the second pattern input unit 200 respectively, and a fingerprint pattern that is already divided into areas may be input to the computer 350.

Furthermore, a fingerprint pattern that has been already divided into areas may be stored in a storage device such as an IC card and a hard disk drive so that the area division does not need to be performed at the time of authentication.

With regard to methods of dividing into small areas, the dividing methods, where areas having any arbitrary shape such as a polygon including a hexagon, an octagon, and a circle partially overlap each other, may be applied (FIG. 9A) in addition to the dividing method by which the entire area is filled with small square areas without overlapping each other like a tetragonal lattice. Furthermore, the whole area does not necessarily have to entirely belong to one of the small areas (FIG. 9B). The shape and size of small areas may be determined according to the property of a pattern that is to be a verification object. For example, when a pattern is presumed to be rotating, circles are adopted as small areas so that they are invariant to the rotation.

If the size of the small area is too large, the influence by deformation and the like becomes stronger and therefore the association of the small areas becomes difficult. On the other hand, if the size of the small area is too small, features included in a small area become insufficient and therefore the association becomes difficult. When the object pattern is a fingerprint, a size in which two or three ridge lines are included may be adopted as the size of a small area. With such a size, each small area can contain sufficient information to associate small areas, but is not too large.

In this exemplary example, a mutual correlation coefficient between a small area of an input fingerprint pattern and each small area of a template fingerprint pattern is obtained by the correction value calculation unit 353, and it is paired with an area having the highest correlation. However, the method of associating patterns with each other is not limited to this example. Other methods using values such as the total value of difference values between pixel values within a small area and an arbitrary amount indicating the degree of association between patterns such as a hamming distance may be also adopted.

Further, the reliability of the association may be improved by, after all the small areas have been paired, removing and/or re-pairing pairs that are considered to be incorrect based on the association state of all the areas.

Furthermore, although pairs are generated by comparing all the small areas of the input fingerprint pattern with all the areas of the template fingerprint pattern and associating them in this exemplary example, a restriction may be put on the area to be used. For example, the fingerprinting area in which the fingerprint pattern exists and the background area in which the fingerprint pattern does not exist may be determined, so that the association may be performed only on the fingerprinting area.

Further, in this exemplary example the density is used as the feature value. A position (coordinate value) may be also used as a feature value. Since the position at which a finger is pressed is different for each input process, a deviation is caused in the input position. Therefore, the positions of corresponding small areas may be different between the input fingerprint pattern and the template fingerprint pattern. Therefore, it is necessary to correct the position to align the corresponding small areas with each other.

If the small area R1 needs to be moved to the right by 30 pixels and to the bottom by 20 pixels in order to align the small area Ra of the template fingerprint pattern with the small area R1 of the input fingerprint pattern, the correction value of the position can be expressed as horizontal +30 pixels (when the right direction is defined as a positive direction) and vertical −20 pixels (when the upward direction is defined as a positive direction). In this manner, position correction information can be used as a feature value. Further, in addition to the position, a rotation can be incorporated as a feature value.

Examples of other available feature values include the extent of deformation. For example, deformation of a small area can be approximated by an affine transformation, and the coefficient of the affine transformation can be used as a feature value. Although the display 410 is used as the output unit 400 in this exemplary example, any given result notification means can be used as the output unit, such as opening a gate for a person with an access permission by transmitting a signal to a gate apparatus, and setting for an access allowance condition by communicating with an information system.

Second Exemplary Example

Figure 10:
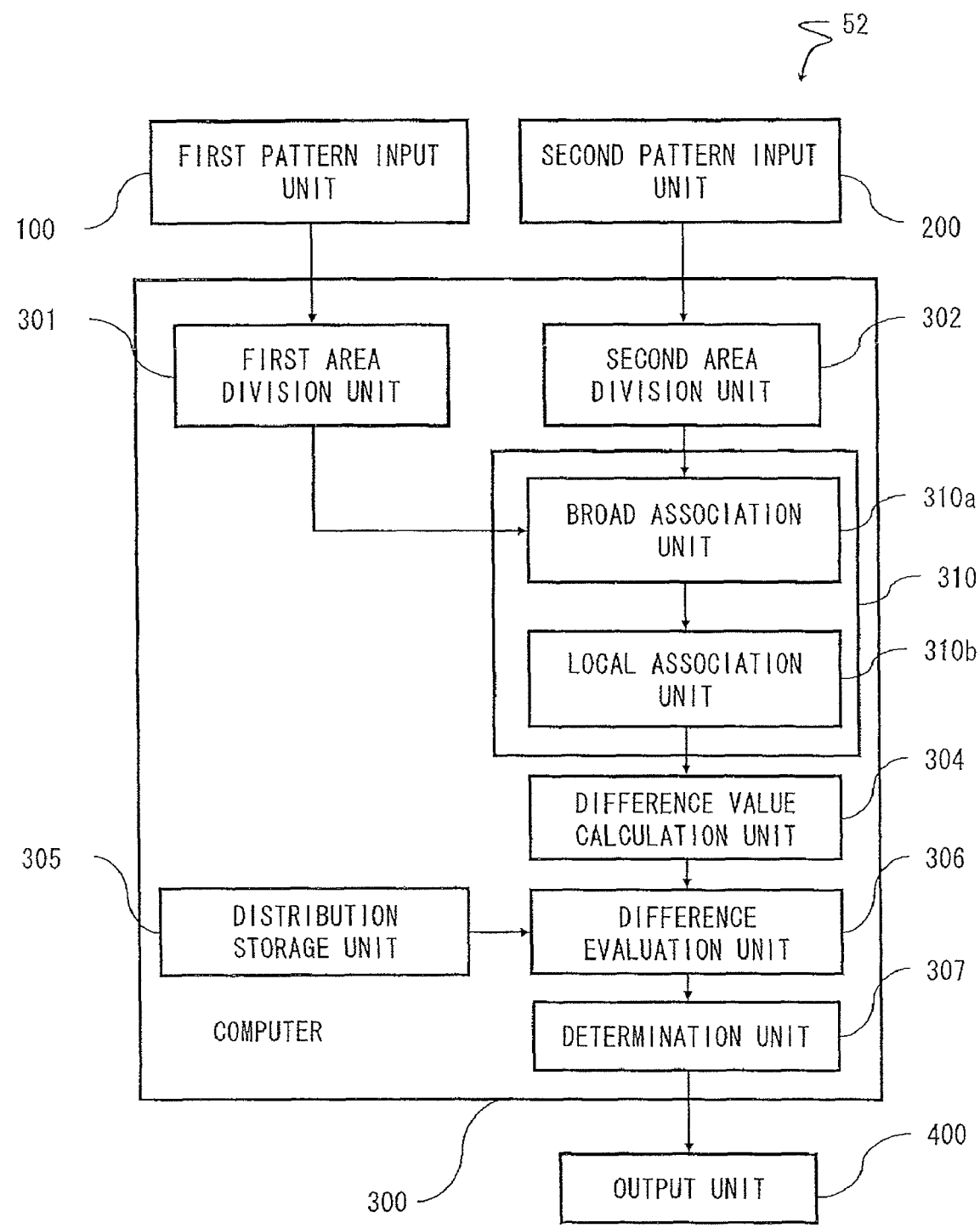
FIG. 10 is a schematic block diagram showing a configuration of a pattern verification apparatus in accordance with a second exemplary example of the present invention.
Figure 11:
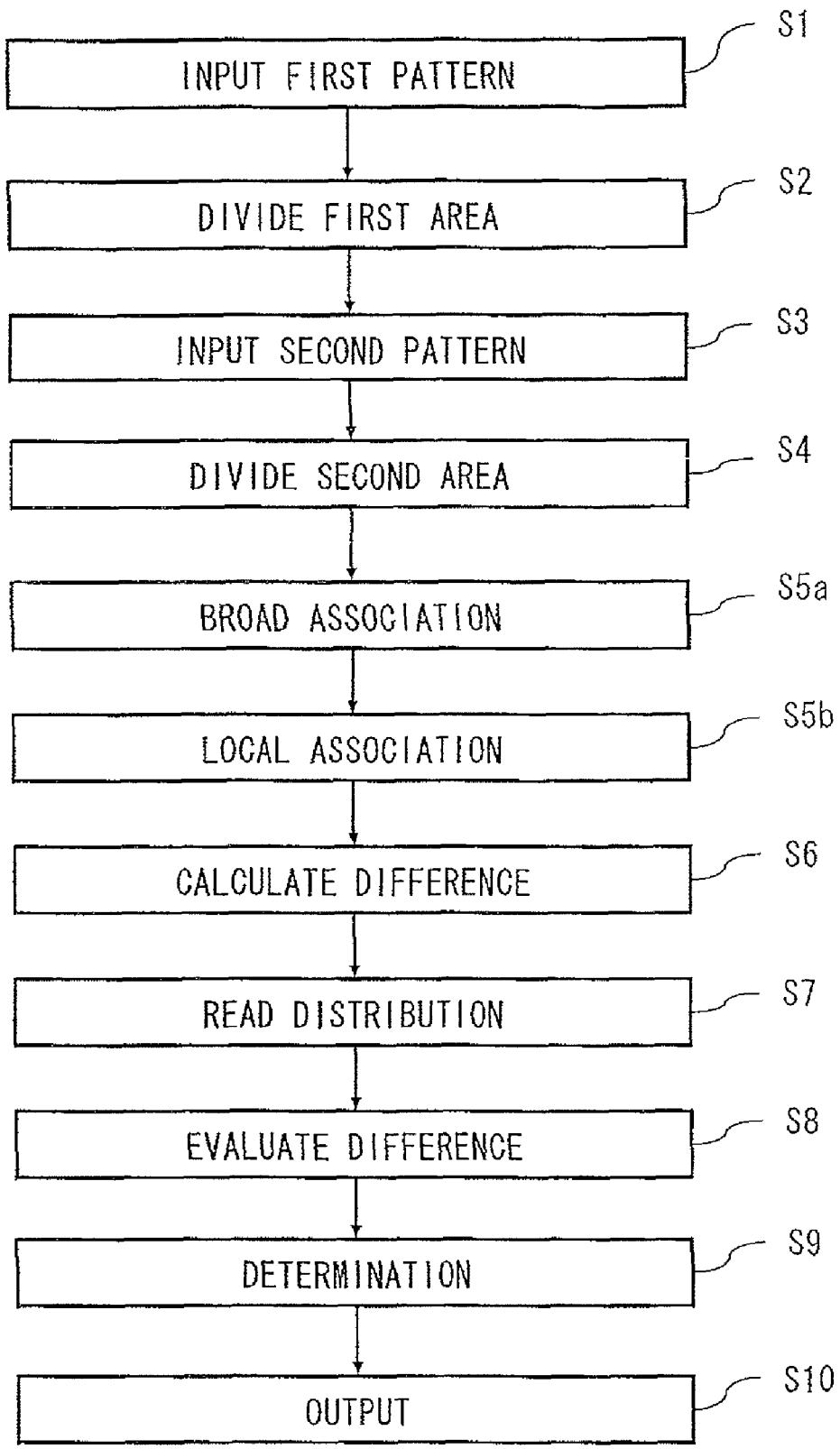
FIG. 11 is a flowchart for explaining an operation of a pattern verification apparatus in accordance with a second exemplary embodiment of the present invention.
Figure 12:
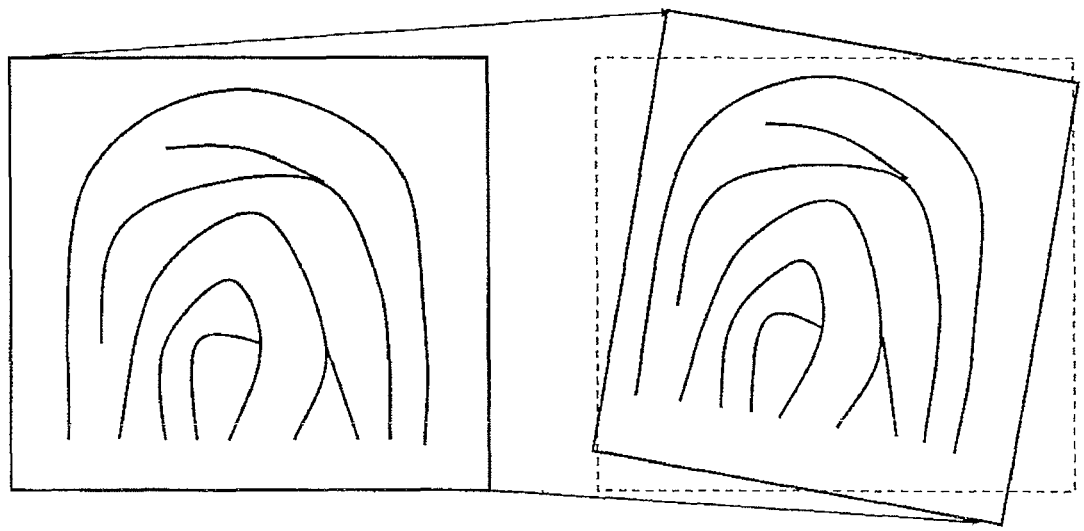
FIG. 12 is an explanatory diagram for explaining an associating process in a broad sense in accordance with a second exemplary embodiment of the present invention.
Figure 13:
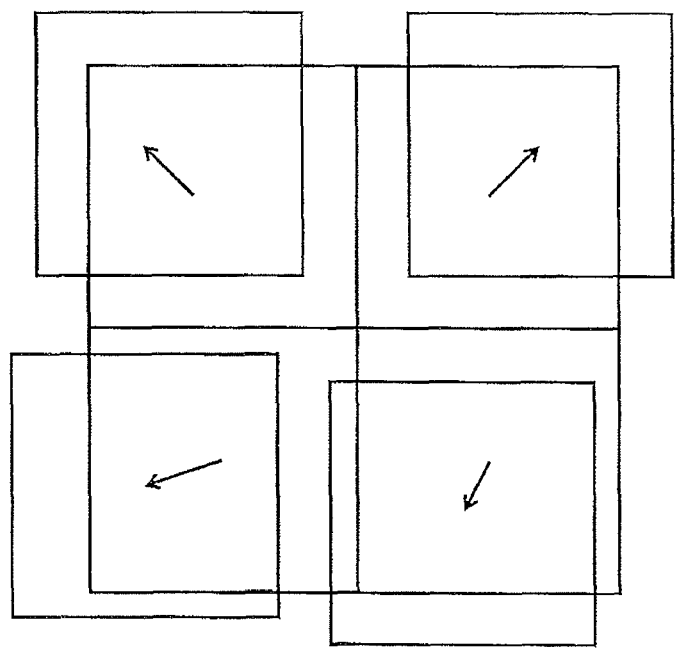
FIG. 13 is an explanatory diagram for explaining an associating process in a small sense in accordance with a second exemplary embodiment of the present invention.
Figure 14:
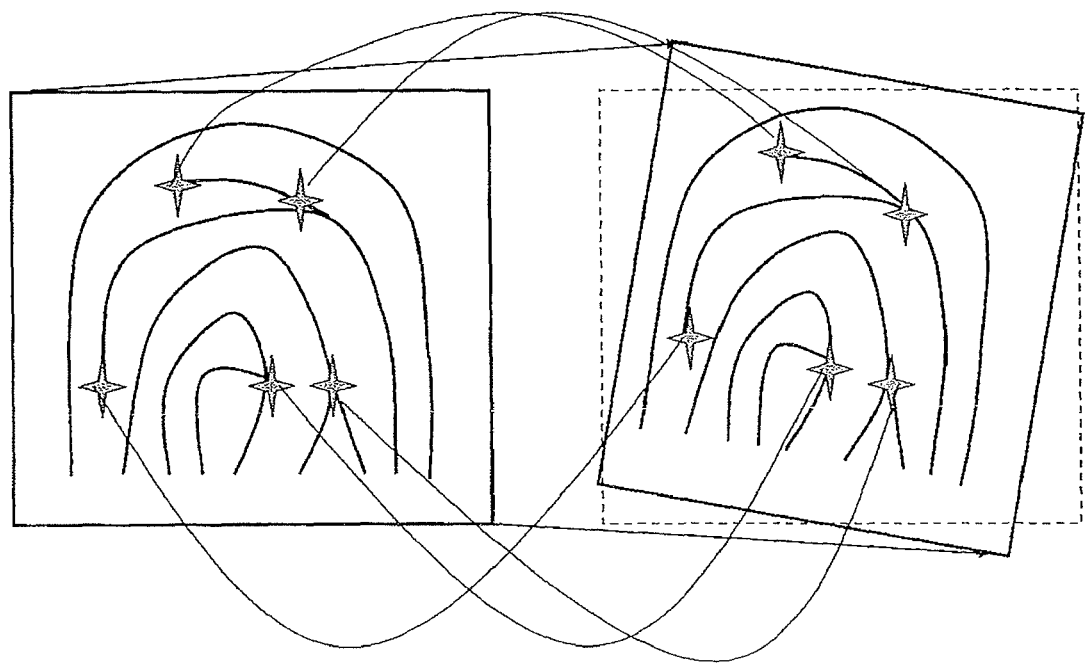
FIG. 14 is an explanatory diagram for explaining a specific method of an associating process in a broad sense in accordance with a second exemplary embodiment of the present invention.
Figure 15:
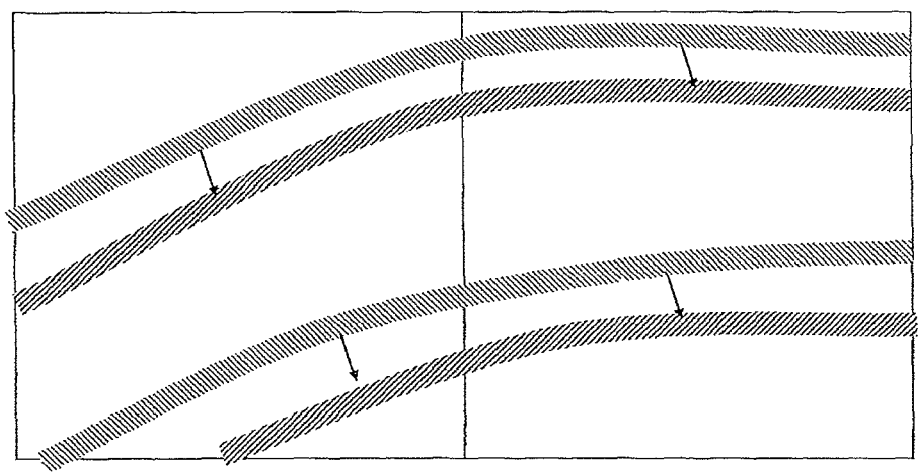
FIG. 15 is an explanatory diagram for explaining an associating process in a small sense in accordance with a second exemplary embodiment of the present invention.

Next, a second exemplary example is explained with reference to FIGS. 10 to 15. Although the density is used as a feature value in the first exemplary example, a position (coordinate value) is used as a feature value in this exemplary example. FIG. 10 is a schematic block diagram showing a configuration of a pattern verification apparatus. FIG. 11 is a schematic flowchart for explaining an operation of a pattern verification apparatus. FIG. 12 is an explanatory diagram for explaining an associating process in a broad sense. FIG. 13 is an explanatory diagram for explaining an associating process in a small sense. FIG. 14 is an explanatory diagram for explaining a specific method of an associating process in a broad sense. FIG. 15 is an explanatory diagram for explaining an associating process in a small sense.

As shown in FIG. 3, a correction value calculation unit 310 of the computer 300 includes a broad association unit 310*a* and a local association unit 310*b*. This point is different from the first exemplary example. Note that the operation of each of the first pattern input unit 100, the second pattern input unit 200, the first area division unit 301, the second area division unit 302, the difference value calculation unit 304, the distribution storage unit 305, the difference value evaluation unit 306, and the determination unit 307 is the same as that of the first exemplary embodiment.

Only the features different from those of the first exemplary embodiment are explained for the operation of a pattern verification apparatus in accordance with this exemplary example with reference to the flowchart shown in FIG. 11.

The broad association unit 310*a* generates a plurality of small area pairs by associating small areas of an input fingerprint pattern with small areas of a template fingerprint pattern, calculates a correction value for conforming the coordinate values of respective small areas included in the small area pair, performs a correction to conform the coordinate value of a small area on the input fingerprint pattern side to the coordinate value of a small area on the template fingerprint pattern side based on the correction value, and corrects a positional deviation between each pattern in a broad manner (S5*a*).

After the correction performed by the broad association unit 310*a*, the local association unit 310*b* calculates a correction value, which is for performing a fine adjustment of a position on small area basis, based on the coordinate value of a small area of the input fingerprint pattern and the coordinate value of a small area of the template fingerprint pattern, and corrects a positional deviation between each small area by the correction value (S5*b*).

In this exemplary example, a first pattern and a second pattern are firstly associated by the broad association unit 310*a*, and after that, a correction value is determined by examining precise association for each small area by the local association unit 310*b*. Therefore, for example, the influence by the deformation of the entire pattern and the like is lessened, and therefore the false matching rate can be evaluated with higher accuracy.

As shown in FIG. 12, the broad association unit 310*a* estimates deformation caused in the entire input fingerprint pattern, performs broad association between each small area by specifying deformation so as to be conformed to the template fingerprint pattern, and corrects the position so that two patterns overlap each other.

As shown in FIG. 13, the local association unit 310*b* searches for a place that matches with the small area of the input fingerprint pattern better than any other places, with centering the position which is corrected by the broad association unit 310*a* such that two patterns overlap each other, and calculates a movement value (coordinate adjustment value) from the position corrected by the broad association unit 310*a* as a correction value.

The broad association unit 310*a* and the local association unit 310*b* calculate their correction values in mutually different methods. For example, the broad association unit 310*a* associates the entire fingerprint pattern by using end points and branch points of fingerprint ridge lines, i.e., the so-called "minutiae" as shown in FIG. 14. The local association unit 310*b* calculates a mutual correlation coefficient of an image pattern of a small area and selects a place having the highest correlation as shown in FIG. 15.

Since a finger is not a rigid body, a fingerprint pattern is deformed locally. After the broad association unit 310*a* conforms the entire pattern, the local association unit 310*b* conforms the pattern locally so that even local deformation can be addressed. A local deformation must have similar deformations in adjacent areas. Therefore, when fingerprint patterns obtained from the same finger are compared, the correction values in the adjacent areas obtained by the local association unit 310*b* must have similar values.

On the other hand, when fingerprint patterns captured from different fingers are compared, a place that has the highest correlation by chance is selected. Therefore, the correction value would be any proper value, and thus correction values in adjacent areas can be regarded as random values. That is, similarly to the example explained in the first exemplary example, the occurrence distribution stored in the distribution storage unit 305 also becomes a uniform distribution of random numbers in this exemplary example. Other features are similar to those of the first exemplary example.

In this exemplary example, the association is performed in two steps, i.e., a step performed by the broad association unit 310*a* and another step performed the local association unit 310*b*. In the local association unit 310*b*, a fine adjustment value is obtained. Therefore, in this exemplary example, the correction values obtained by the local association unit 310*b* when comparing patterns belonging to different categories becomes more random values in comparison to those of the first exemplary example, and therefore the false matching rate can be evaluated with higher accuracy.

As described above, by calculating correction values based on the processing by the broad association unit 310*a* and the processing by the local association unit 310*b*, the randomness of each correction value becomes higher in a case where verification is determined to be unsuccessful. Therefore, the probability in which verification is determined to be successful even though it should be determined to be unsuccessful can be effectively reduced.

Third Exemplary Example

Figure 16:
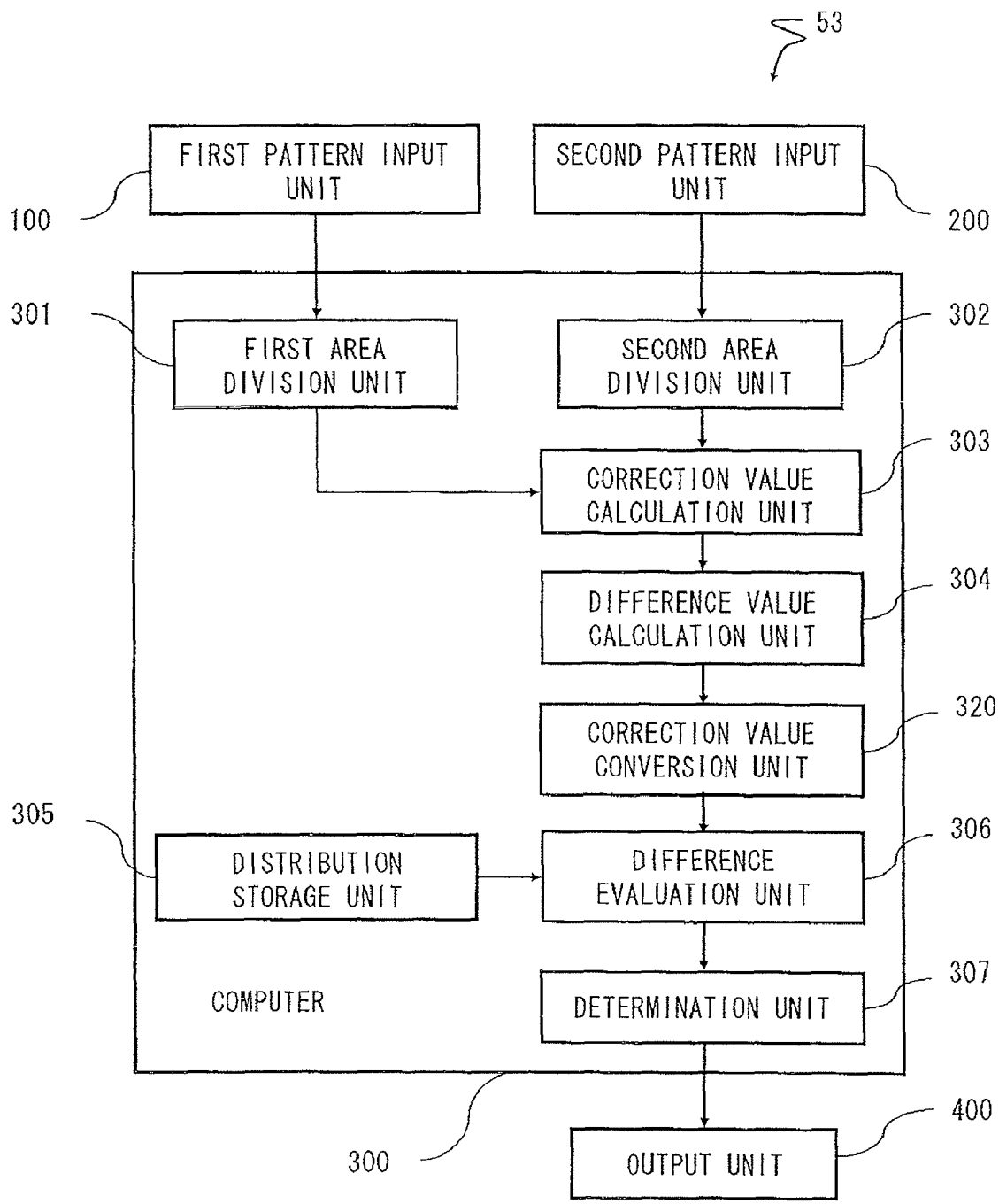
FIG. 16 is a schematic block diagram showing a configuration of a pattern verification apparatus in accordance with a third exemplary example of the present invention.
Figure 17:
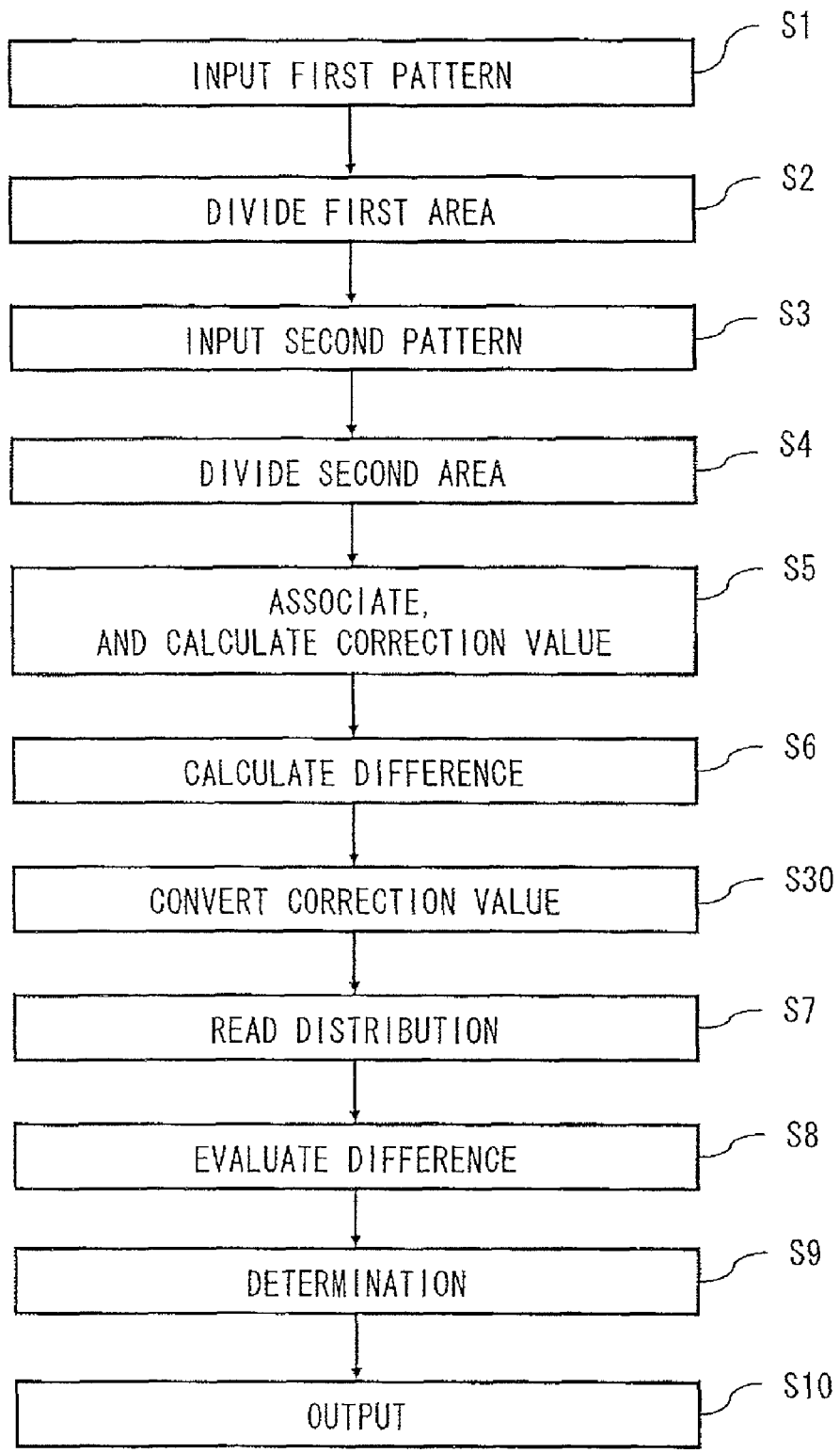
FIG. 17 is a flowchart for explaining an operation of a pattern verification apparatus in accordance with a third exemplary embodiment of the present invention.
Figure 18A:
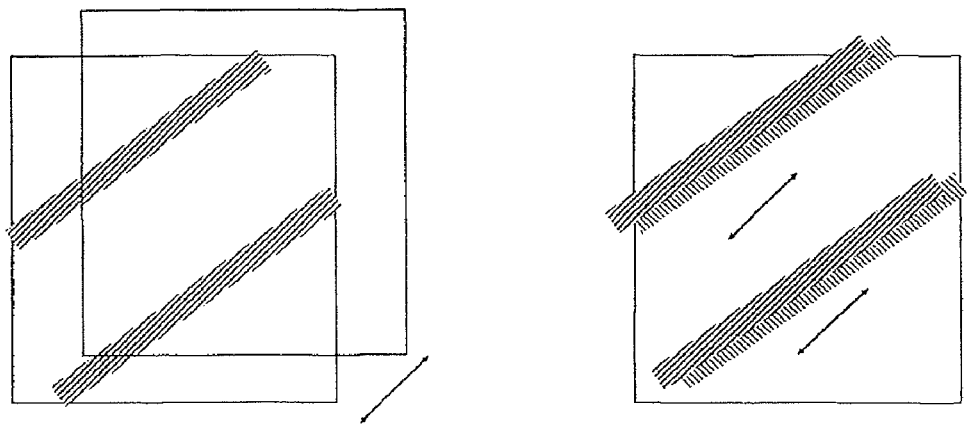
FIG. 18A is an explanatory diagram for explaining a conversion method of a correction value in accordance with a third exemplary embodiment of the present invention.
Figure 18B:
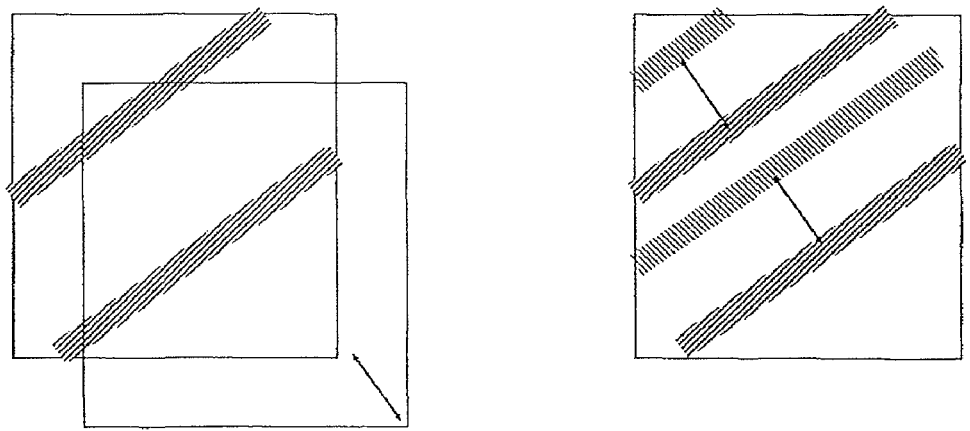
FIG. 18B is an explanatory diagram for explaining a conversion method of a correction value in accordance with a third exemplary embodiment of the present invention.

A third exemplary example is explained with reference to FIGS. 16 to 18. In contrast to the first exemplary example, the computer 320 in accordance with this exemplary example includes a correction value conversion unit 320. FIG. 16 is a schematic block diagram showing a configuration of a pattern verification apparatus. FIG. 17 is a flowchart for explaining an operation of a pattern verification apparatus. FIGS. 18A and 18*b* are explanatory diagrams for explaining a conversion method of a correction value.

The correction value conversion unit 320 converts a correction value so as to improve the property of the difference value according to the property of a pattern to be a verification object. Assume that the pattern to be a verification object is a fingerprint pattern in this example.

As schematically shown in FIG. 18A, ridge lines within a small area extend in parallel with each other. Therefore, even though the small area is moved parallel in the extending direction of the ridge lines, the image in the small area does not significantly change before and after the movement of the small area.

On the other hands, as schematically shown in FIG. 18B, if the small area is moved parallel in the direction perpendicular to the extending direction of the ridge lines, the image in the small area could change significantly before and after the movement of the small area. In this case, there is a possibility that the value of a correction value used for matching or approximating feature values in respective small areas forming a small area pair may increase.

Therefore, when a coordinate value is adopted as a feature value, it becomes possible to stabilize the value of the correction value used to match or approximate the coordinate values of small areas forming a small area pair, by limiting to a correction of moving the small area parallel in the extending direction of ridge lines and by eliminating the correction of moving the small area parallel in the direction perpendicular to the extending direction of ridge lines.

For example, the correction value conversion unit 320 specifies the extending direction of ridge lines by using a filter (predetermined calculating formula) and specifies the direction for stabilizing the correction value. The correction value conversion unit 320 can also examine variations in the degree of matching by moving the small area in several directions. For example, if the small area is moved in a certain direction by several pixels and thereby the correlation coefficient changes significantly, the direction can be determined to be for stabilizing the correction value as in a similar manner when the small area is moved in the extending direction of ridge lines. On the other hand, if the variation of the correlation coefficient is small, the direction can be determined to be for making the correction value unstable in a similar manner when the small area is moved in the direction perpendicular to the extending direction of ridge lines.

An operation of a pattern verification apparatus in accordance with this exemplary example is explained hereinafter with reference to the flowchart shown in FIG. 17. In contrast to the first exemplary example, after the performance of difference calculation, the correction value conversion unit 320 changes the value of a correction value by changing the degree of association of the small area, and thereby stabilizes the difference value even further (S30). If the difference value is stabilized by the processing by the correction value conversion unit 320, it can be presumed that the patterns to be a verification pattern are arranged in positions that are mutually suitable for the comparison. Therefore, the processing by the correction value conversion unit 320 enables the comparison to be performed with higher accuracy.

Figure 19:
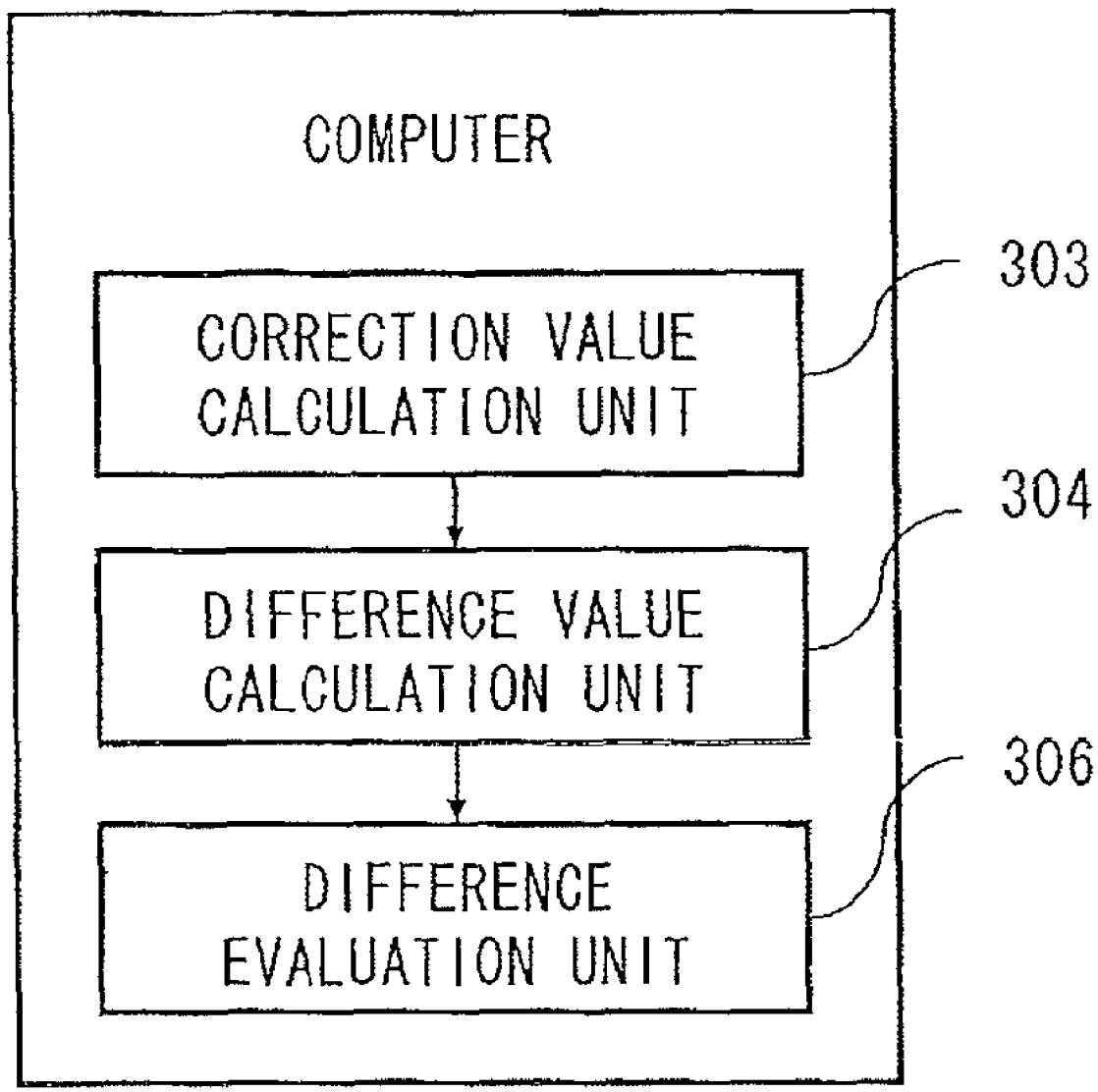
FIG. 19 is a schematic block diagram showing a configuration of a pattern verification apparatus in accordance with other exemplary embodiments.

The technical scope of the present invention is not limited to above-described exemplary embodiments. As shown in FIG. 19, the pattern verification apparatus (computer) should include at least the correction value calculation unit 303, the difference value calculation unit 304, and the difference value evaluation unit 306. The present invention is applicable to other uses in which the determination unit 307 is unnecessary. It is also applied to authentication other than fingerprint authentication. It is also applied to uses other than biometric authentication.

This application is based upon and claims the benefit of priority from Japanese patent application No. 2008-037077, filed on Feb. 19, 2008, the disclosure of which is incorporated herein in its entirety by reference.

Industrial Applicability

The present invention can be applied to pattern verification apparatuses, pattern verification methods, and programs.

The invention claimed is:

1. A pattern verification apparatus comprising:
   a processor; and
   a memory,
   wherein the processor includes:
      a correction value calculation unit that generates a plurality of unit area pairs by associating each of a plurality of unit areas generated by dividing a second pattern with each of a plurality of unit areas generated by dividing a first pattern according to a degree of similarity of a pattern, and calculates a correction value, which is suitable for matching or approximating unique feature values of the respective unit areas of the mutually associated unit areas, on the unit area pair basis;
      a difference value calculation unit that calculates a difference value indicating a difference between the correction values based on a comparison of the correction values between the unit area pairs that are positioned spatially adjacent to each other; and
      a verification evaluation value calculation unit that reads out a condition indicating that patterns belong to mutually different categories from the memory, and calculates a verification evaluation value according to a verification result between the condition and a plurality of difference values calculated by the difference value calculation unit.

2. The pattern verification apparatus according to claim 1, wherein each of the first and second patterns has a distribution in which the difference value between the feature values of mutually adjacent unit areas in a case where same categories are compared is stochastically smaller than a difference value in a case where different categories are compared.

3. The pattern verification apparatus according to claim 1, wherein the verification evaluation value calculation unit performs calculation in which the verification evaluation value does not change widely as a result of being affected by the difference value having a large absolute value.

4. The pattern verification apparatus according to claim 1, wherein the condition defines a state where random numbers are randomly arranged.

5. The pattern verification apparatus according to claim 1, wherein the processor further includes a determination unit that determines a verification result based on a comparison between the verification evaluation value and a threshold.

6. The pattern verification apparatus according to claim 1, wherein
   the first pattern is a pattern registered in advance in an internal or external storage medium, and
   the second pattern is a pattern captured by an internal or external pattern acquisition device every time pattern comparison is performed.

7. The pattern verification apparatus according to claim 1, wherein the feature value is a value indicating a positional deviation of the second pattern with respect to the first pattern.

8. The pattern verification apparatus according to claim 7, wherein the correction value calculation unit performs at least first processing that performs alignment of the second pattern against the first pattern based on similarity between patterns, and second processing that performs alignment of the unit area of the first pattern against the unit area of the second pattern based on similarity between patterns.

9. The pattern verification apparatus according to claim 7, wherein a calculation method of the feature value is determined according to an aspect of a pattern that is to be verified.

10. A pattern verification method for performing verification of a pattern, the method comprising:
generating a plurality of unit area pairs by associating each of a plurality of unit areas generated by dividing a second pattern with each of a plurality of unit areas generated by dividing a first pattern according to a degree of similarity of a pattern, and calculates a correction value, which is suitable for matching or approximating unique feature values of the respective unit areas of the mutually associated unit areas, on the unit area pair basis;
calculating a difference value indicating a difference between the correction values based on a comparison of the correction values between the unit area pairs that are positioned spatially adjacent to each other; and
calculating a verification evaluation value according to a verification result between a condition indicating that patterns belong to mutually different categories and a plurality of difference values calculated by the difference value calculation unit.

11. The pattern verification apparatus according to claim 10, determining a verification result based on a comparison between the verification evaluation value and a threshold.

12. The pattern verification method according to claim 10, wherein each of the first and second patterns has a distribution in which the difference value between the feature values of the unit areas positioned mutually adjacent positions in a case where same categories are compared is stochastically smaller than a difference value in a case where different categories are compared.

13. The pattern verification method according to claim 10, said calculating for the verification evaluation value is performed such that the verification evaluation value does not change widely as a result of being affected by the difference value having a large absolute value.

14. The pattern verification method according to claim 10, wherein the condition indicating that patterns belong to mutually different categories defines a state where random numbers are randomly arranged.

15. A non-transitory computer readable medium storing a computer program that causes a computer to perform pattern matching, the computer program causing the computer to:
generate a plurality of unit area pairs by associating each of a plurality of unit areas generated by dividing a second pattern with each of a plurality of unit areas generated by dividing a first pattern according to a degree of similarity of a pattern, and calculates a correction value, which is suitable for matching or approximating unique feature values of the respective unit areas of the mutually associated unit areas, on the unit area pair basis;
calculate a difference value indicating a difference between the correction values based on a comparison of the correction values between the unit area pairs that are positioned spatially adjacent to each other; and
calculate a verification evaluation value according to a verification result between a condition indicating that patterns belong to mutually different categories and a plurality of difference values calculated by the difference value calculation unit.

16. The non-transitory computer readable medium according to claim 15, wherein each of the first and second patterns has a distribution in which the difference value between the feature values of the unit areas positioned mutually adjacent positions in a case where same categories are compared is stochastically smaller than a difference value in a case where different categories are compared.

17. The non-transitory computer readable medium according to claim 15, wherein the computer program further causes the computer to perform calculation in which the verification evaluation value does not change widely as a result of being affected by the difference value having a large absolute value.

18. The non-transitory computer readable medium according to claim 15, wherein the condition indicating that patterns belong to mutually different categories defines a state where random numbers are randomly arranged.

* * * * *

UNITED STATES PATENT AND TRADEMARK OFFICE
CERTIFICATE OF CORRECTION

| | | |
|---|---|---|
| PATENT NO. | : 8,340,370 B2 | Page 1 of 1 |
| APPLICATION NO. | : 12/918295 | |
| DATED | : December 25, 2012 | |
| INVENTOR(S) | : Monden | |

It is certified that error appears in the above-identified patent and that said Letters Patent is hereby corrected as shown below:

In the Claims

Column 19, Line 26, Claim 11: delete "The pattern verification apparatus according to claim 10, determining a verification" and insert -- The pattern verification method according to claim 10, further comprising determining a verification --

Signed and Sealed this
Fourteenth Day of October, 2014

Michelle K. Lee
*Deputy Director of the United States Patent and Trademark Office*